United States Patent
Huang (10) Patent No.: US 10,356,086 B1
(45) Date of Patent: *Jul. 16, 2019

(54) METHODS AND APPARATUSES FOR SECURELY OPERATING SHARED HOST COMPUTERS WITH PORTABLE APPARATUSES

(71) Applicant: Evan Huang, Cupertino, CA (US)

(72) Inventor: Evan Huang, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,134

(22) Filed: Aug. 27, 2018

Related U.S. Application Data (63) Continuation of application No. 14/935,432, filed on Nov. 8, 2015, now Pat. No. 10,097,535, which is a continuation of application No. 14/287,050, filed on May 25, 2014, now Pat. No. 9,197,633, which is a continuation of application No. 13/545,965, filed on Jul. 10, 2012, now Pat. No. 8,931,063, which is a continuation of application No. 12/223,309, filed on Jul. 28, 2008, now Pat. No. 8,245,293.

(60) Provisional application No. 60/788,189, filed on Mar. 31, 2006.

(51) Int. Cl.
  *H04L 9/00* (2006.01)
  *H04L 29/06* (2006.01)

(52) U.S. Cl.
  CPC .......... *H04L 63/083* (2013.01); *H04L 63/062* (2013.01); *H04L 63/0861* (2013.01)

(58) Field of Classification Search
  CPC .. H04L 63/083; H04L 63/062; H04L 63/0861
  See application file for complete search history.

(56) References Cited

U.S. PATENT DOCUMENTS

| | | |
|---|---|---|
| 5,509,120 A | 4/1996 | Merkin et al. |
| 5,694,600 A | 12/1997 | Khenson et al. |
| 6,016,402 A | 1/2000 | Thomas et al. |
| 6,122,734 A | 9/2000 | Jeon |
| 6,170,055 B1 | 1/2001 | Meyer et al. |
| 6,320,510 B2 | 11/2001 | Menkedick et al. |
| 6,385,707 B1 | 5/2002 | Maffezzoni |
| 6,601,139 B1 | 7/2003 | Suzuki |
| 6,707,386 B1 | 3/2004 | Pruisner |
| 6,718,463 B1 | 4/2004 | Malik |

(Continued)

*Primary Examiner* — Beemnet W Dada
(74) *Attorney, Agent, or Firm* — Roark IP (57) ABSTRACT

The present invention provides methods and apparatuses that utilize a portable apparatus to securely operate a host electronic device. Typically, each portable apparatus includes a data storage unit which stores an operating system and other software. In one example, a portable apparatus can provide a virtual operating environment on top of a host's operating system for a host device. In another example, a portable apparatus containing its operating system can directly boot a host device with one or more hardware profiles. Furthermore, a device-dependent protection against software piracy, a user-dependent protection against sensitive data leaks, a controllable host operating environment to prevent unwanted information exposure, and a secure restoration procedure to prevent virus infection between the host device users may be incorporated. Moreover, a predefined information may also be utilized to authorize a connected-state guest operation environment in the host device.

9 Claims, 9 Drawing Sheets

(56) References Cited

U.S. PATENT DOCUMENTS

| | | | |
|---|---|---|---|
| 7,055,026 B2 | 5/2006 | Gere | |
| 7,073,013 B2 | 7/2006 | Lasser | |
| 7,136,951 B2 | 11/2006 | Deng et al. | |
| 7,181,740 B2 | 2/2007 | Purkeypile et al. | |
| 7,539,863 B2 | 5/2009 | Phillips et al. | |
| 7,666,151 B2 | 2/2010 | Sullivan et al. | |
| 7,734,933 B1 | 6/2010 | Marek et al. | |
| 7,797,525 B2 | 9/2010 | Lee et al. | |
| 8,285,987 B1 | 10/2012 | Kimball et al. | |
| 8,555,377 B2 | 10/2013 | Pate | |
| 8,892,876 B1 | 11/2014 | Huang et al. | |
| 9,037,511 B2 | 5/2015 | Roth et al. | |
| 10,097,535 B1* | 10/2018 | Huang | H04L 63/083 |
| 2002/0067273 A1 | 6/2002 | Jaques et al. | |
| 2002/0091805 A1 | 7/2002 | Phillips et al. | |
| 2002/0124245 A1 | 9/2002 | Maddux et al. | |
| 2002/0169987 A1 | 11/2002 | Meushaw et al. | |
| 2003/0110371 A1 | 6/2003 | Yang et al. | |
| 2004/0019778 A1 | 1/2004 | Gere | |
| 2004/0095382 A1 | 5/2004 | Fisher et al. | |
| 2004/0111015 A1 | 6/2004 | Ladd | |
| 2004/0143740 A1 | 7/2004 | Tsai | |
| 2004/0153539 A1 | 8/2004 | Lyon et al. | |
| 2004/0165487 A1 | 8/2004 | Liao | |
| 2005/0083741 A1 | 4/2005 | Chang et al. | |
| 2005/0097199 A1 | 5/2005 | Woodard et al. | |
| 2005/0193189 A1 | 9/2005 | Kim | |
| 2005/0204013 A1 | 9/2005 | Raghunath et al. | |
| 2005/0262343 A1 | 11/2005 | Jorgensen | |
| 2006/0004667 A1 | 1/2006 | Neil | |
| 2006/0015748 A1* | 1/2006 | Goto | G06F 21/52 713/190 |
| 2006/0041934 A1 | 2/2006 | Metzler | |
| 2007/0016693 A1 | 1/2007 | Goodrich | |
| 2007/0027988 A1 | 2/2007 | Lavin et al. | |
| 2007/0208928 A1 | 9/2007 | Rios et al. | |
| 2011/0202765 A1 | 8/2011 | McGrane et al. | |
| 2011/0202916 A1 | 9/2011 | VoBa et al. | |

* cited by examiner

| | 604 | 606 |
|---|---|---|
| MacAddr OUI: | AA:01:05 | AA:01:05 |
| MacAddr Serial Number: | 10:0A:11 | 00:0A:11 |
| Volume Serial Number: | 18E6-1614 | 3CD8-2FCE |
| CDROM ID String: | CDROM YP326S | CDROM YP325S |
| IDE ID String: | YPOD 1001 HARDDISK | YPOD 1002 HARDDISK |
| Drive Serial Number: | YP10032 | YP10033 |
| BIOS Data: | 88 65 C1 81 | B6 EC 38 3C |

METHODS AND APPARATUSES FOR SECURELY OPERATING SHARED HOST COMPUTERS WITH PORTABLE APPARATUSES

CROSS REFERENCE TO RELATED APPLICATIONS

This application is a continuation application of and claims priority to U.S. application Ser. No. 14/935,432, filed on Nov. 18, 2015; which is a continuation of U.S. application Ser. No. 14/287,050, filed on May 25, 2014; which is a continuation of U.S. application Ser. No. 13/545,965, filed on Jul. 10, 2012; which is a continuation of U.S. application Ser. No. 12/223,309, filed on Jul. 28, 2008, now U.S. Pat. No. 8,245,293; which claims priority from provisional patent application Ser. No. 60/788,189, filed on Mar. 31, 2006. The disclosure of the prior applications are considered part of (and incorporated by reference in) the disclosure of this application.

FIELD OF THE INVENTION

The present invention generally relates to the area of operating computer systems, and more particularly relates to methods or apparatuses for securely operating shared host computers with portable apparatuses.

DESCRIPTION OF THE RELATED ART

As the computer evolved from mainframe to minicomputer to PC, it progressed from a device for solving specific problems, to a companion device for storing valued personal data. Users now look to the computer for a private, secure, familiar working environment that can include an Internet browser, email software, text editor, presentation software, and spreadsheet application, along with parameter settings for those applications, such as options to choose a home page, browser favorites, incoming and outgoing email accounts, word-processing style sheets, and presentation and spreadsheet templates. More importantly, a familiar working environment may also include personal files generated from these applications, including valuable files such as resumes, emails, spreadsheets, presentations, and address books.

Although many PC users can now afford to have their own private working environment, computers are typically shared with many other users in schools, libraries, businesses, and homes. On the other hand, a single user may own more than one computer. Computer users often encounter a situation to switch between computers in which they require maintaining consistent settings such as email accounts and network connections among several computers.

U.S. Pub. No. 2003/0110371 published by Yang et al. teaches a method to partially maintain a consistent operating environment by utilizing a USB flash memory device to store the user-specific information from a first computer system. The stored information is temporarily loaded from the USB drive into the same application in a second computer system. This method is trying to transport the personalized computer settings among computer systems with an identical or similar software environment. However, this method neither teaches how to transport a set of familiar applications among computer systems nor teaches how to transport a set of personal files associated with the applications among computer systems. As such, a user may have emails, contacts, and other personal files created by different types of applications scattered over different systems.

A possible approach to maintain a consistent operating environment is to store an operating system along with a list of software applications and personal files in a removable data storage medium, which is then used to operate different computers. This approach can be considered as using a portable apparatus to operate one or more host computers. The portability here not only means the physical mobility of the device but also means the adaptation of the system to operate host computers with different hardware configurations. Accordingly, the host computer needs to be able to boot from the portable apparatus. One implementation is to have the portable apparatus burned in a CD-ROM. The ISO 9660 specification, a bootable CD-ROM format, provides new boot capabilities for personal computers. This specification describes how the BIOS boot procedure can be enhanced to support the CD-ROM using INT 13 calling conventions for enabling the CD-ROM to boot as the "A" drive or "C" drive without device drivers. U.S. Pat. No. 6,122,734 issued to Jeon teaches a bootable CD-ROM disk manufacturing system. However, a portable apparatus implemented in CD-ROMs limits the users' abilities to modify or delete the software applications, to install new applications, or to store personal files on the portable apparatus.

U.S. Pat. No. 6,016,402 issued to Thomas et al. teaches a method to integrate a removable media disk drive into an operating system where the removable media disk drive is first recognized as a fixed disk type then recognized as a floppy disk type. U.S. Pat. No. 5,694,600 issued to Khenson et al. teaches an apparatus for booting a computer using a removable medium disk drive. U.S. Pat. No. 6,385,707 issued to Maffezzoni teaches an apparatus for copying files between drives of a computer system including operating system to create a reliable bootable drive. However, the usage of bootable medium drive in these methods or apparatuses is restricted to provide diagnostic support or backup in the event of a system failure, which only requires to access the file system in the internal hard drive of a problematic computer instead of fully operating a computer system and its peripheral devices.

U.S. Pat. No. 6,170,055 issued to Meyer et al. teaches an approach to create a subset of operating system from a computer in a removable high capacity media disk drive for disaster recovery of the computer. The removable high capacity media includes all necessary operating system components to completely load the operating system and the graphical user interface and to provide a user with access to all computer peripherals. Since the removable high capacity disk includes all of the machine-specific files for a computer system, this rescue disk is only suitable for operating the original computer system or computers with similar hardware configurations.

U.S. Pat. No. 6,601,139 issued to Suzuki teaches an information processing apparatus based on the single medium activated platform architecture operated by a removable data storage medium containing all necessary software and content. A second removable data storage medium with different software and content can also operate the same apparatus. However, the removable data storage media are designed to operate the information processing apparatuses with a specific architecture instead of computers with different hardware configurations.

U.S. Pat. No. 6,718,463 issued to Malik teaches an apparatus and method to boot a data processing system from a removable medium. A first boot identifies the file system of a first data processing system and the file system of the removable medium. The necessary drivers, registry information, and applications needed to operate the hardware of the first data processing system are then copied into the removable medium. The removable medium with the copied hardware information is now ready to boot a second data processing system, which has a similar hardware configuration to the first data processing system. U.S. Pub. No. 2004/0019778 published by Gere also teaches a method and system for implementing a transportable operating system boot environment on a computer system by impressed the hardware and software configuration information onto the stored operating system environment. Both approaches create complete hardware controllable environments for specific computers on a apparatus, which may restrict the portability of the apparatus to only a few host computers since the required drivers and their parameter settings may cause confusions when the number of host computers increases. Although Malik teaches a way to clear up the copied information, the overhead of copying information in order to establish a bootable environment increases the processing time for booting up a host computer tremendously.

Traditionally, a close network environment like a corporate intranet installs an antivirus program with the newest update to all the computers within its firewall. Popularity of laptop computers introduces a variation to the network environment. U.S. Pub. No. 2005/0097199 published by Woodard et al. teaches a method and apparatus for maintaining the network security with remote scanning on newly detected network devices. Due to the possibility of frequently switching users with different portable apparatuses on the same shared host computer, the detection of network devices may be cumbersome and the required resources for remote scanning may be intensive.

Another security concern is that a portable apparatus with a malicious operating system may possibly cause an infection of the host computer and other computers in the network. U.S. Pat. No. 5,509,120 issued to Merkin et al. teaches a method and apparatus for detecting computer viruses during power on self test. The detection is based on a cyclic redundancy check (CRC) on the master boot record and the boot record of the selected operating system. The CRC values are generated for the pre-installed systems and the protection is to prevent the virus infection on the boot record, which may load in a malicious program instead of the operating system during booting. However, to pre-record CRC values for variety of portable apparatuses may not be practical and a malicious portable apparatus can happen in the operation system level instead of only the boot record level.

There are many licensing and security issues that need to be addressed from the viewpoint of different parties involved in a connected-state operation environment created by portable apparatuses and host computers. First, preventing a software piracy of data stored in a portable apparatus is important. A device-dependent protection is desirable to prevent duplicating certain information from one portable apparatus to another apparatus. Second, preventing an exposure of sensitive personal information to others when the apparatus is lost or stolen is another important security issue. A user-dependent protection is desirable to prevent viewing certain information stored in the portable apparatus. Third, providing a controllable host operating environment is also important for prevention of sensitive and/or personal information exposure. For example, a key-logging program or another malicious software potentially residing on a host operating environment presents a high security risk for unintentional personal information leak during an operation of a virtual operating environment. Fourth, preventing viruses in a portable apparatus from infecting one or more host computers is also an important security requirement. A secure restoration procedure for the host computer is desirable between users to prevent virus infections from a previous usage of the host computer. The secure restoration procedure for the host computer is also critical for prevention of sensitive and/or personal information exposure to subsequent usage of the host computer. Furthermore, a server-based facility management may be desirable in an enterprise network to maintain and supervise shared host computers used by portable apparatuses.

Therefore, addressing methods and apparatuses to share information securely between a portable apparatus and a plurality of host computers regardless of each host's operating environment is highly beneficial to the field of the invention.

SUMMARY

This section as well as the abstract is for the purpose of summarizing some aspects of the present invention and to briefly introduce some features or preferred embodiments. Simplifications or omissions may be made to avoid obscuring the purpose of the section or the abstract. Such simplifications or omissions are not intended to limit the scope of the present invention.

In one embodiment of the invention, a system comprising: a computer-readable portable storage medium having a guest portable operation system which is encrypted; a host computer adapted to execute a loader program from the portable storage medium and to receive a password from a user to decrypt the guest portable operation system to activate a guest operation environment on the host computer from the guest portable operation system; and wherein the guest operation environment provided by the guest portable operation system accommodates authorized use of intellectual property data from the portable storage medium Furthermore, in another embodiment of the invention, a system comprising: a computer-readable portable storage medium having a processor and a guest portable operation system which is encrypted, wherein the processor is adapted to receive user dependent binding data to decrypt the guest portable operation system; a host computer adapted to create a guest operation environment from the decrypted guest portable operation system; and wherein the guest operation environment provided by the guest portable operation system accommodates authorized use of intellectual property data from the portable storage medium.

Furthermore, in another embodiment of the invention, a method of creating a connected-state guest operation environment on a host computer from a computer-readable portable storage medium comprising: loading a first set of instructions from a portable storage medium onto a host computer; receiving a password for the first set of instructions; loading a second set of instructions which are encrypted from a guest operation system in the portable storage medium onto the host computer; decrypting the second set of instructions by the first set of instructions with the received password wherein the decrypted second set of instructions create a connected-state guest operation environment on the host computer; and authorizing use of intellectual property data from the portable storage medium.

Furthermore, in another embodiment of the invention, a system comprising: a portable apparatus having at least one device dependent information and a computer-readable storage medium storing a guest operation system which is bound with the at least one device dependent information and is encrypted; the portable apparatus further including a processor which is adapted to receive user dependent binding data to decrypt the guest operation system and to authenticate with the at least one device dependent information; a host computer containing at least one peripheral device; the host computer adapted to establish a guest operation environment from the decrypted and authenticated guest operation system wherein the guest operation environment accommodates access of the at least one peripheral device; and wherein the guest operation environment provided by the guest operation system accommodates authorized use of intellectual property data from the computer readable portable storage medium.

Furthermore, in another embodiment of the invention, a system comprising: a host computer coupled to at least one peripheral device; a portable apparatus containing a microprocessor coupled to a memory block and a data storage medium, wherein the data storage medium unit has a guest operation system; an authentication procedure performed in the portable apparatus to verify the guest operation system with a user-dependent encryption key; a data communication port in the portable apparatus, wherein the data communication port accommodates transfer of data between the host computer and the portable apparatus; a portable apparatus loader program executed in the host computer, wherein the loader program decides whether to establish an authenticated connected-state operation environment between the host computer and the portable apparatus through the data communication port; and wherein the authenticated connected-state operation environment accommodates access of the at least one peripheral device in the host computer.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
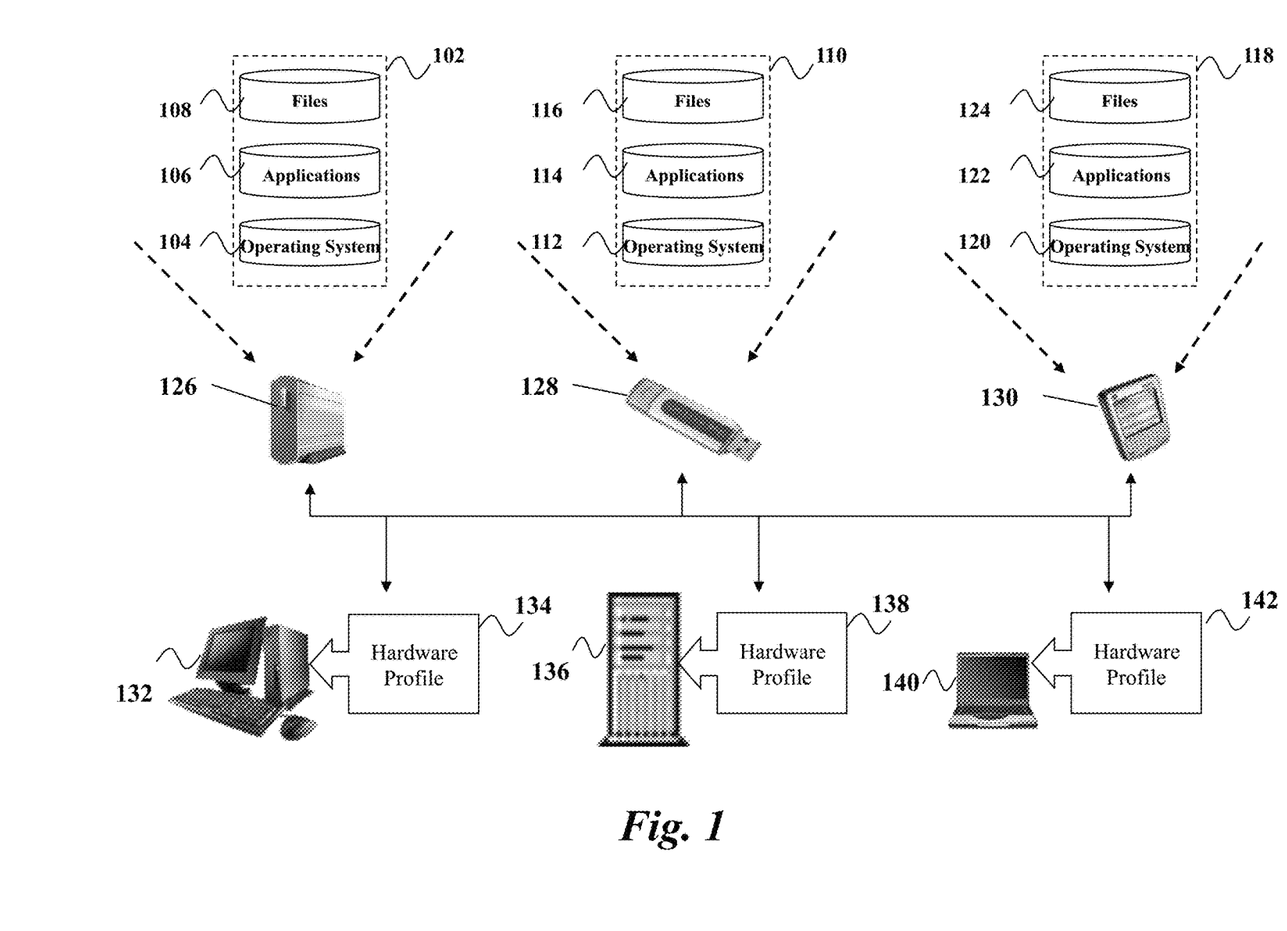
FIG. 1 shows a plurality of portable apparatuses operatively connected to a plurality of host computers in accordance with one or more embodiments of the invention.

Referring now to the drawings, in which like numerals refer to like parts throughout the several views, FIG. 1 shows a plurality of portable apparatuses, i.e., an external hard disk (126), a flash memory drive (128), and an electronic device containing computer readable storage media (e.g. a personal data assistant (PDA), a mobile phone, a tablet computer, and the like) (130) operatively connected to a plurality of host computers (132, 136, 140) in accordance with one or more embodiments of the invention. In another embodiment, the portable apparatus is a removable memory card for a host electronic device (e.g. a personal data assistant (PDA), a mobile phone, a tablet computer, and the like) (130). The term "portable" for each portable apparatus (126, 128, 130) means physical mobility as well as system adaptation for the host device.

In a configuration shown in FIG. 1, each host computer contains its own hardware profile information which is used in conjunction with device and/or user-dependent information in each portable apparatus. The portable apparatuses (126, 128, 130) embed non-volatile storage units containing complete operation systems (102, 110, 118) and each of the operation systems (102, 110, 118) includes data files (108, 116, 124), applications (106, 114, 122), and operating systems (104, 112, 120). Each portable apparatus contains at least one operation system (102, 110, 118), defined here as a "guest operation system" which includes at least one operating system (104, 112, or 120), defined here as a "guest operating system", and the guest operating system operates the host computer under the guest operation system environment after an authorization is granted.

For example, the flash memory drive (128) contains a guest operation system (110). When the flash memory drive (128) is either directly or indirectly connected to a laptop computer (140) (i.e. a type of a host computer), the laptop computer (140) and the flash memory drive (128) are initially engaged in an authorization process. The authorization process typically involves information stored in the hardware profile (142) of the laptop computer and/or user and device-related information stored in the flash memory drive (128). If the flash memory drive (128) is authorized to share data with the laptop computer (140), the flash memory drive (128) generates a guest operation system environment to the laptop computer (140) (e.g. a virtual operating system loaded on top of the host's operating system) from the guest operation system portion (112) of its non-volatile storage unit containing the guest operation system (110).

Continuing with FIG. 1, a major objective of each portable apparatus in this configuration is to provide a consistent operation environment to its user regardless of which host computer and host O/S platforms the user encounters by loading a guest operating system stored in each portable apparatus. In some instances, the guest operating system is a virtual operating system environment loaded on top of a host's operating system. In other instances, the guest operating system becomes a main software-level operating system for the host computer which lacks a software-level operating system other than a firmware or BIOS in the host computer.

The major challenge for a portable apparatus is to deal with the system adaptation for host computers with different hardware configurations such as motherboard, CPU, RAM, and BUS. Furthermore, in the configuration as shown in FIG. 1, each host computer (132, 136, 140) support a list of peripheral hardware devices such as monitors, keyboards, printers, scanners, DVD/CD-ROM's, network adapters, and etc. In order to support these devices produced by different manufacturers, many of these devices require installing drivers provided by peripheral device manufacturers. Furthermore, the manufacturers may also provide a utility program to configure their driver. For example, the driver for the wireless PC card may need to specify an access point, encryption length, encryption phrase, and other parameters. Similar examples can also apply to other peripheral devices, such as network or local printer settings and local area network TCP/IP settings. A collection of drivers and other hardware-specific parameters to operate specific hardware devices, including the portable apparatuses (126, 128, 130), is called a hardware profile. In the configuration as shown in FIG. 1, each host computer stores a hardware profile (134, 138, 142) for authorizing a portable apparatus.

A major benefit of using a plurality of portable apparatuses is cost reduction when a large number of portable apparatuses shares a smaller number of host computers. One example is a school computer lab with a certain number of computers being shared by students. Since the cost of a portable apparatus may only be a fraction of the cost of a host computer, there is less financial burden on the school computer lab when each student uses a portable apparatus that contains a guest operating system as well as application specific data and software. The students can also use their portable apparatuses on host computers at home, which once again can be shared by the portable apparatuses of other family members.

A similar case can also be applied to some centralized service facilities such as a call center, where many operators working on different shifts share a same set of computers. The concept of portable apparatuses which are configured to load personalized guest operating systems to host computers introduces tremendous flexibility in terms of organizing such a facility. Other cases for sharing host computers with portable apparatuses with their own sets of guest operation systems can occur in libraries, Internet cafés, business lounges at airports, corporate intranets, and other places.

Figure 2:
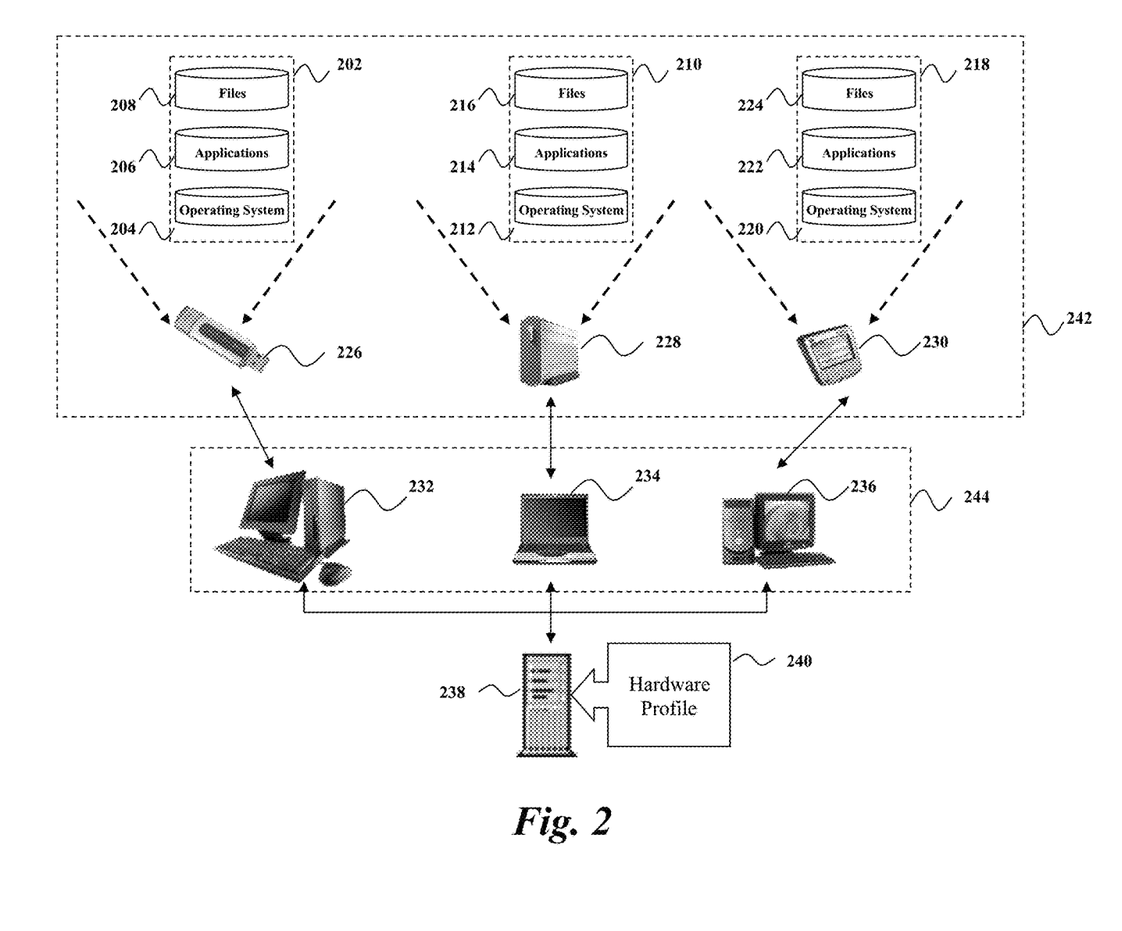
FIG. 2 shows a plurality of portable apparatuses operatively connected to a plurality of host computers with a server centrally managing hardware profiles in accordance with one or more embodiments of the invention.

FIG. 2 shows another configuration of a plurality of portable apparatuses (226, 228, 230) operatively connected to a plurality of host computers (232, 234, 236) in accordance with one or more embodiments of the invention. In the configuration as shown in FIG. 2, a computer server (238) centrally manages a plurality of hardware profiles (240) for the host computers (232, 234, 236) which are operatively connected to the computer server (238). In another embodiment of the invention, a hardware profile is stored in a host computer. Yet in another embodiment of the invention, a hardware profile, and/or its contents can be divided into multiple pieces, and stored partially in a host computer and partially in a computer server. The portable apparatuses (226, 228, 230) contain at least one operating system each (i.e. operating systems 204, 212, 220). These operating systems are "guest" operating systems which are loaded to the host computers (232, 234, 236) when the portable apparatuses (226, 228, 230) are either directly or indirectly connected to the host computers (232, 235, 236) and authorized to share data. In some instances, the guest operating system is a virtual operating system environment loaded on top of a host's operating system. In other instances, the guest operating system becomes a main software-level operating system for the host computer which lacks a software-level operating system other than a firmware or BIOS in the host computer. Yet in other instances, the guest operating system replaces a native software-level operating system of the host computer, and becomes a main software-level 30 operating system for the host computer.

Each portable apparatus (226, 228, 230) embeds at least one non-volatile storage unit containing a complete operation system (202, 210, 228), which includes data files (208, 216, 224), applications (206, 214, 222), and at least one guest operating system (204, 212, 220). When a portable apparatus is either directly or indirectly connected to a host computer, these data resident in the portable apparatus provides a consistent operation environment for its user regardless of a type of a host operating system resident on a host computer because the portable apparatus loads its own guest operating system in the host computer.

Continuing with FIG. 2, a plurality of host computers (244) is managed by a server computer (238) to monitor the usage of the host computers (232, 234, 236) by portable apparatuses (242) in an enterprise or a school network. In one embodiment of the invention, a restoration procedure to verify the hardware profile (240) or the virtual operation environment is performed on the host computers (232, 234, 236) to prevent virus propagation among the portable apparatuses (242) or the host computers (232, 234, 236). In another embodiment of the invention, the host computer (234) is a shared laptop for sales people in an enterprise or for students at a school. To prevent an unintentional exposure of personal information through a contaminated hardware profile or a virus-infected virtual operation environment, a controllable operation environment by a portable apparatus (228) is desirable during the operation. In another embodiment of the invention, a host computer (232) is a shared public desktop in a library or an Internet Café. To avoid an unwanted exposure of personal information for a stolen or lost device (226), a user-dependent protection mechanism is used during the operation. In another embodiment of the invention, a device-dependent protection mechanism is used to prevent software piracy for the operating system or other application in the portable apparatus.

Figure 3:
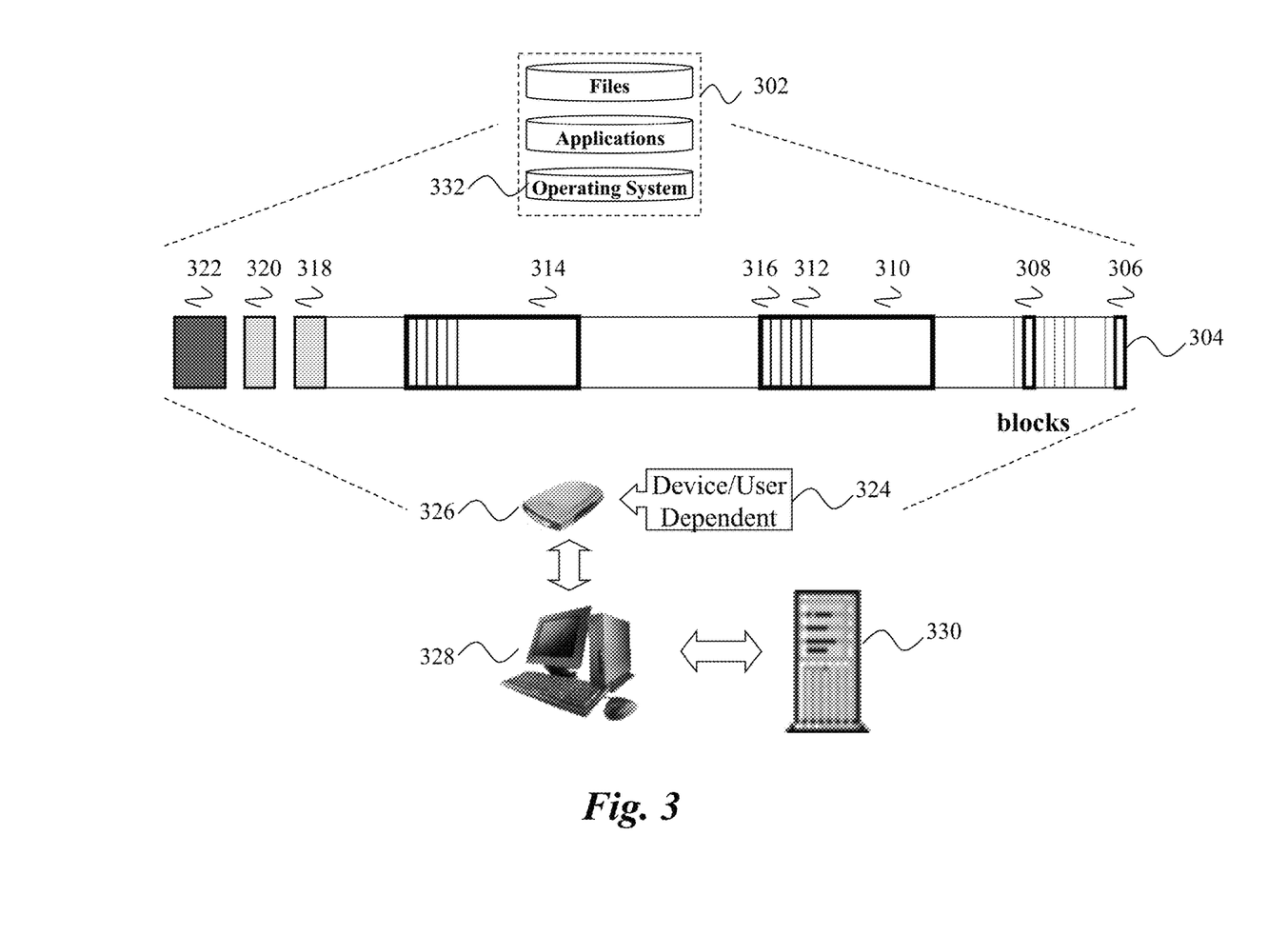
FIG. 3 shows a particular example of files, applications, and a guest operating system resident in a memory space of a portable apparatus operatively connected to a host computer in accordance with one or more embodiments of the invention.

FIG. 3 shows an example of a portable apparatus (326) where at least one operation system (302) with at least one operating system (332) is stored in a logical information storage area (310 or 314) in at least one memory area (304) of the apparatus in accordance with one or more embodiments of the invention. A block (308) in the memory area (304) is a combination of one or more bytes. In one embodiment of the invention, a block (308) is a hard disk sector with 512 bytes in the memory area (304). A first sector (306) is the master boot record containing partition table information of the memory area (304). In one embodiment of the invention, the logical information storage area (310 or 314) is a logical drive specified by the partition table. In another embodiment of the invention, each partition is formatted into a file system and the logical information storage area (310 or 314) can be a file, a directory, or other information-holding structure in the file system. A hidden area (318) of the memory area (304) contains one or more blocks which are outside of blocks specified in the partition table information. A device-dependent information area (320) is separated from the memory area (304). In one embodiment of the invention, the device-dependent information is stored in a device firmware or a BIOS.

Figure 4:
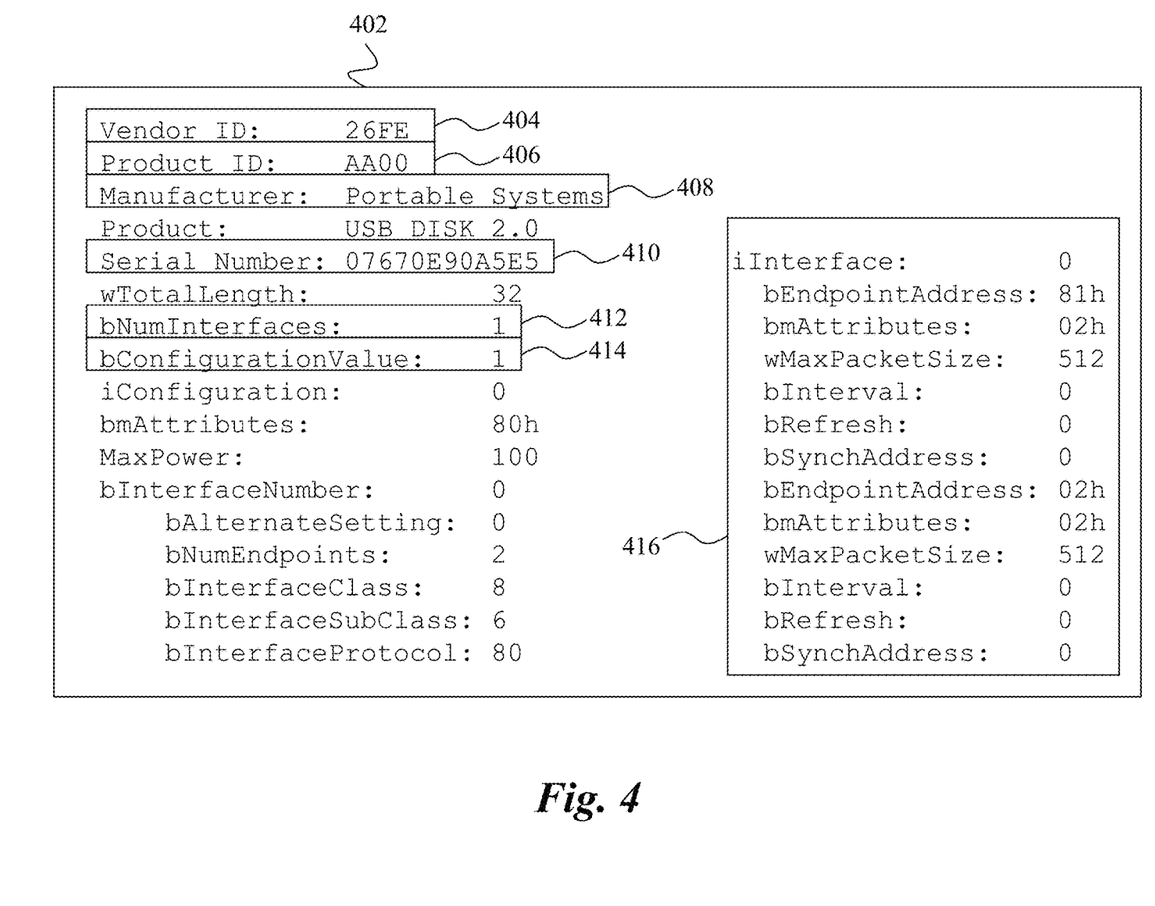
FIG. 4 shows an example of device-dependent firmware information in accordance with one or more embodiments of the invention.

FIG. 4 shows an example of firmware information (402), where a Vendor ID (404), a Product ID (406), a manufacturer name (408), a serial number (410), an interface number (412), a configuration value (414), interface parameters (416), and other information can be used to uniquely identify a particular device. Relating to FIG. 3, this information can further be used to create device-dependent binding data (324) between the operation system (302) and the portable apparatus (326). In one embodiment of the invention, the portable apparatus (326) also includes a microprocessor (322). In another embodiment of the invention, a biometric portable apparatus uses the microprocessor (322) to provide the user-dependent binding data (324) between the operation system (302) and its user. After an authentication process, an instance of a connected-state operation environment of the operation system (302) is created by the portable apparatus (326) in the host computer (328). This operation environment can be further monitored and/or maintained by a server computer (330) through a network. In one embodiment of the invention, the server computer (330) contains hardware profile data for a host computer (328) operatively connected to the server computer (330).

Figure 5:
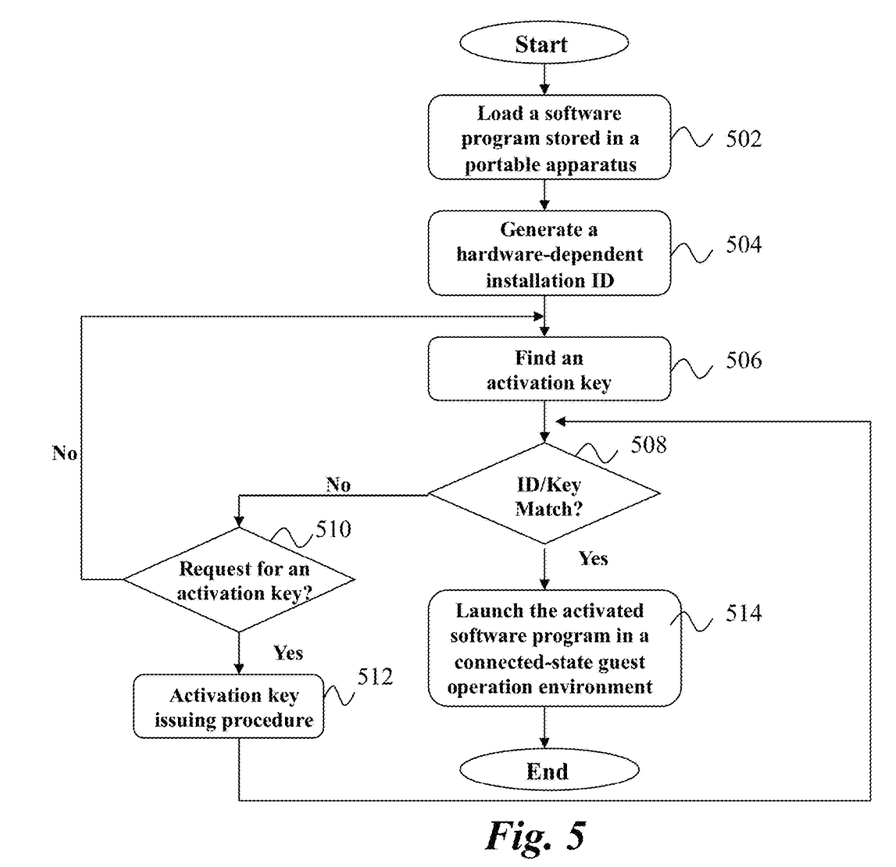
FIG. 5 shows an example of an activation validation procedure by loading a software program from a portable apparatus in accordance with one or more embodiments of the invention.

Relating to FIG. 3, FIG. 5 shows an activation validation procedure for loading a software program in an operation system (302) from a portable apparatus (326) into a connected-state guest operation environment in a host computer (328). This activation validation procedure includes loading a selected software program, generating a hardware-dependent installation identification or a hardware-dependent installation ID, checking whether the generated hardware-dependent installation ID matches an activation key, launching the activated software program in the connected-state guest operation environment if there is a match between the hardware-dependent installation ID and the activation key, and requesting an activation key to a user, a software vendor, or an intellectual property compliance entity if there is a mismatch between the hardware-dependent installation ID and the activation key.

In STEP 502, a software program is first loaded from the portable apparatus (326). In STEP 504, the hardware-dependent installation ID is then generated. In STEP 506, the software program searches for an activation key typically stored in the portable apparatus (326), the host computer (328), or the computer server (330). If the activation key is not found or the hardware-dependent installation ID does not match the activation key in STEP 508, then the software program determines whether an activation key issuing procedure (i.e. STEP 512) is requested (i.e. STEP 510) by the user, the software vendor, or the intellectual property compliance entity. If the activation key issuing procedure is requested, then an activation key is typically acquired in STEP 512 by going through an activation key issuing process defined by the user, the software vendor, or the intellectual property compliance entity before checking a match of the hardware-dependent installation ID and a newly-issued activation key in STEP 508. If the hardware-dependent installation ID and the activation key matches, the activated software program is launched in a connected-state guest operation environment in the host computer (328), as shown in STEP 514.

One embodiment which incorporates at least some aspects of the invention displayed by FIG. 2, FIG. 3, and FIG. 5 is a Windows Product Activation for Windows XP from Microsoft. In this example, an activation confirmation, hardware configurations at the activation, and current hardware configurations are all stored in a WPA.dbl file under System32 subdirectory of Windows directory. In one embodiment of the invention, a logical information storage area (310) of a memory area (304) in a portable apparatus (326) is a logical drive containing an installed Windows XP operating system that will be used to boot a host computer (328) and create a connected-state operation environment.

In this particular situation, required hardware configurations for the previously confirmed activation is provided by the host computer (328) and the license is issued to the host computer (328) instead of the portable apparatus (326). The license file, WPA.dbl, are incorporated from a hardware profile to create an activated connected-state operation environment, which is compliant with the activation validation procedure in FIG. 5 without re-activation. In a configuration as shown in FIG. 2, in accordance with one or more embodiments of the invention, a server computer (238) can further be used to manage and maintain the activation procedures for a plurality of portable apparatuses (242) and a plurality of host computers (244).

Continuing with the Windows XP example, in one embodiment of the invention, the logical information storage area (310) of the memory area (304) in the portable apparatus (326) is a partition or an image file containing an installed Windows XP operating system that will be used to boot into a virtual operation environment in the host computer and create a connected-state operation environment. A virtual operation environment can provide a consistent simulated hardware configuration within the host operating environment regardless the hardware configuration of the host computer (328). To avoid illegally duplicating one activated operation system (302) on different portable apparatuses, a set of parameters of the hardware configuration to create a unique connected-state operation environment can be stored outside of the logical information storage area (310), which is used to store the operation system (302).

Figure 6:
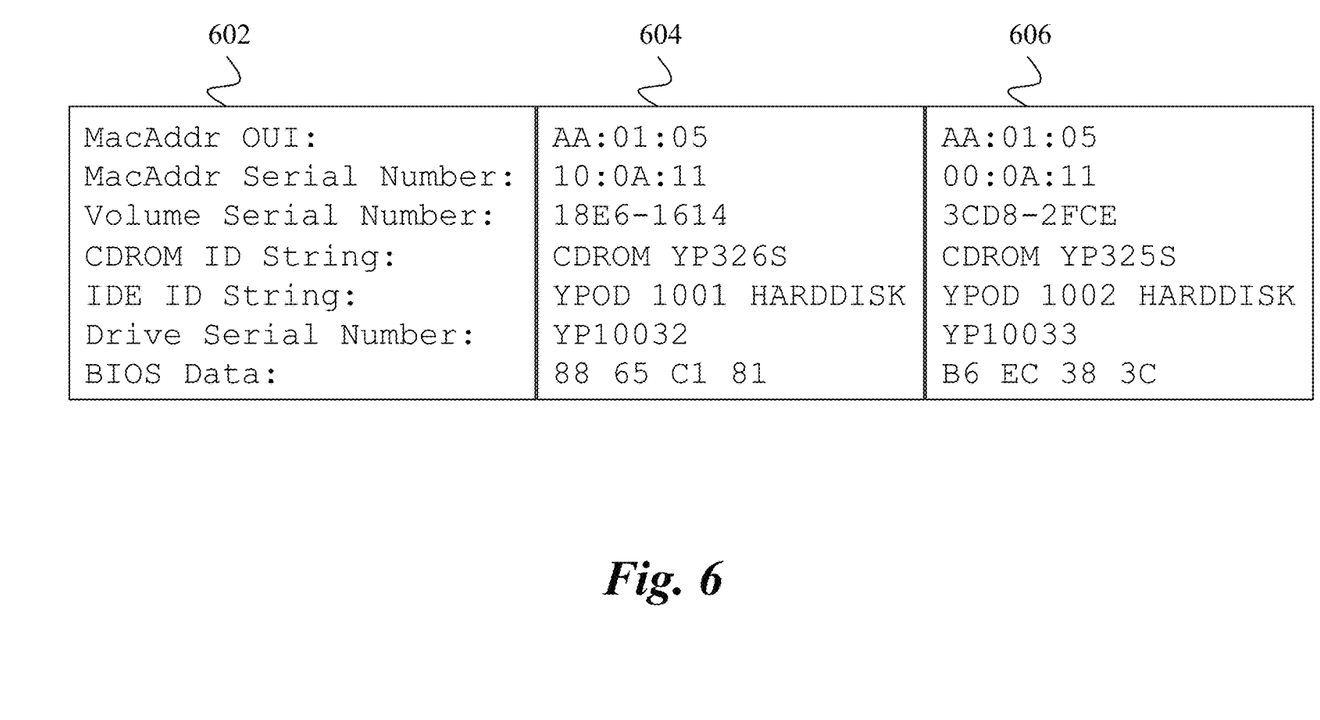
FIG. 6 shows an example of hardware configuration parameters for a virtual environment including a set of hardware configuration along with a first set of parameters and a second set of parameters in accordance with one or more embodiments of the invention.

FIG. 6 shows an example of hardware configuration parameters for the virtual operation environment including a set of hardware configuration (602) along with a first set of parameters (604) and a second set of parameters (606). Relating to FIG. 3, an activated operation system (302) in a portable apparatus (326) is associated with a set of parameters (i.e. 604 or 606). In one embodiment of the invention, this set of parameters is stored in a device-dependent information area (320) separated from a memory area (304). In another embodiment of the invention, this set of parameters is encrypted by the device-dependent information (402) as shown in FIG. 4 and is stored in the hidden area (318) of the memory area (304). In an additional embodiment, a second logical information storage area (314) contains a software program to create a virtual operation environment in a host computer (328) for the operation system (302) stored in the first logical information storage area (310). This program can create a unique virtual operation environment by loading the set of parameters from the device dependent information area (320), by decrypting the encrypted parameters in the hidden area (318), or by decrypting a block (316) within the software program in the first or the second logical information storage area (310 or 314) that contains the parameters encrypted by the device-dependent information (402).

The aforementioned embodiments for the Windows XP example can be applied to any software program including operation systems and applications stored in the portable apparatus. The activation procedures of those programs can be device-dependent to the portable apparatus (326) and/or the host computer (328). An activated connected-state operation environment means that the connected-state operation between the portable apparatus (326) and the host computer (328) will incorporate the required activation information for at least one previously activated software program in the operation system (302) stored in the logical information storage area (310 or 314). As illustrated in FIG. 5, in one embodiment of the invention, an activated connected-state operation environment may involve comparing a hardware-dependent installation ID information (i.e. STEP 504) against an activation key, wherein the activation key is store maintained, and/or newly-issued by a host computer or a key activation-authorizing entity (i.e. STEP 506, STEP 508). In one example, the key activation-authorizing entity may be a digital rights management (DRM) program configured to grant or deny software license and access agreements to a software program stored in a portable apparatus for providing a guest operation environment in the host computer. The key activation-authorizing entity may be executed by a CPU and a memory unit in a host computer or a data server operatively connected to the host computer. If there is a match between the hardware-dependent installation ID information and the activation key, then the connected-state operation environment can be successfully activated. On the other hand, if there is a mismatch between the hardware-dependent installation ID information and the activation key, then a new activation key may be requested (i.e. STEP 510) to the host computer or another key activation-authorizing entity. The new activation key may be successfully issued (i.e. STEP 512), if the host computer or another key activation-authorization entity grants the new activation key issuance (e.g. for satisfying a software licensing and access policy maintained by the host computer or another key activation-authorization entity). If the host computer or another key activation-authorization entity denies issuance of the new activation key, then in one embodiment of the invention, the guest operation environment is denied from creating a connected-state operation in the host computer. In another embodiment of the invention, if the host computer or another key activation-authorization entity denies issuance of the new activation key, then guest operation environment creates a connected-state operation with limited functionality in the host computer. Yet in another embodiment of the invention, if the host computer or another key activation-authorization entity denies issuance of the new activation key, then a software program stored in the portable apparatus is denied from launching in the guest operation environment for the host computer, or launched with limited functionality in the guest operation environment for the host computer.

To avoid the exposure of personal information for a stolen/lost portable apparatus (326), a user-dependent protection mechanism is desirable for creating the connected-state operation environment from the operation system (302) stored in the logical information storage area (310). In one embodiment of the invention, a user-dependent encryption key generated from user's password, fingerprint, voice, or other inputs is used to decrypt all the blocks in the logical information storage area (310). In another embodiment of the invention, only selected blocks (312, 316) are encrypted. In one instance of this embodiment, the encrypted block is determined by a signature within the block. In another instance of this embodiment, the encrypted block is determined by a block encryption mapping table. In one embodiment in accordance with the invention, the selected blocks (312, 316) underneath the logical information storage area (310) are encrypted to create private files or folders in the connected-state operation environment. In another embodiment in accordance with the invention, the selected blocks (312, 316) in the logical information storage area (310) implements a user-dependent encrypted pseudo disk image for the operation system (302). The encrypted pseudo disk image can be decrypted by the driver for the simulated hard drive in a virtual operation environment.

Figure 7:
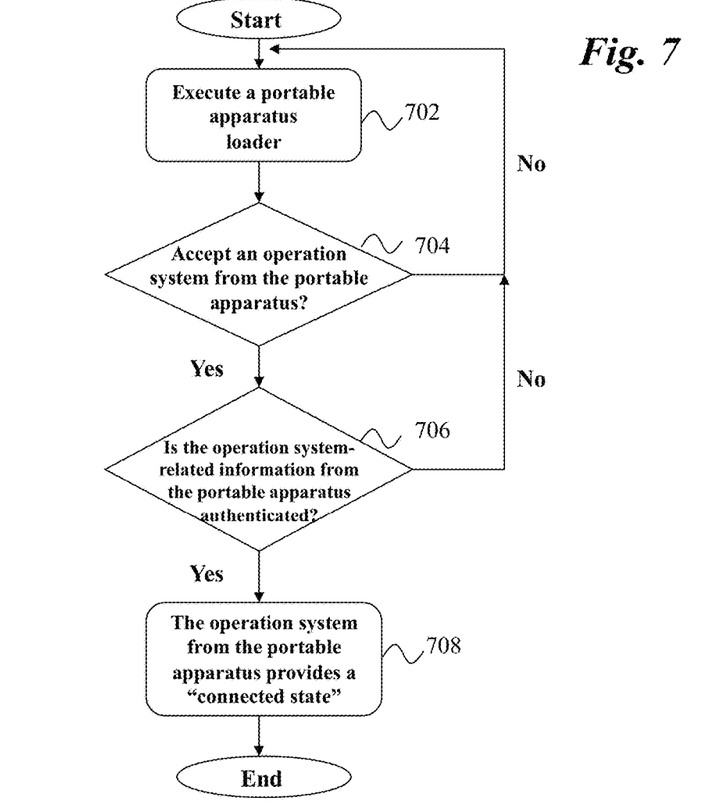
FIG. 7 shows an example of loading a guest operating system from a portable apparatus to a host computer to establish an authenticated connected-state operation environment in accordance with one or more embodiments of the invention.

Relating to FIG. 3, FIG. 7 shows a procedure for establishing an authenticated connected-state operation between a portable apparatus (326) and a host computer (328) in accordance with one embodiment of the invention. In STEP 702, the host computer (328) executes a portable apparatus loader program residing in the portable apparatus (326) or the host computer (328). Pre-defined information stored in the host computer (328) or through a network server computer (330) decides whether to accept the operation system (302) from the portable apparatus (326) in STEP 704. In one embodiment of the invention, the pre-defined information is a specific set of vendor identifiers and device types of the portable apparatuses or certain device IDs stored in a hidden area (318). This embodiment can restrict portable apparatuses to work with host computers within a controllable environment like an office intranet. In another embodiment of the invention, the pre-defined information is a serial number of a specific portable apparatus which is used by an owner of the portable apparatus (326) to reserve a public host computer (328) through the server computer (330) for a particular time slot. In an additional embodiment of the invention, STEP 704 is skipped if there is no pre-defined information in the home host computer (328).

STEP 706 is an authentication procedure which is performed in the portable apparatus (326) and/or the host computer (328) to verify the information loaded from the portable apparatus (326). In one embodiment of the invention, a user provides a user-dependent encryption key to decrypt at least one block of the logical information storage area (310) storing the operation system (302). In one instance of this embodiment, a decryption procedure uses an embedded processor (322) in the portable apparatus (326) and a decrypted block is sent to the host computer (328). In another instance of this embodiment, the decryption procedure is implemented by a program in the host computer (328).

Continuing with FIG. 7 related to FIG. 3, in another embodiment for STEP 706, a device-dependent encryption key from the hidden area (318) or from the information area (320) is used to decrypt at least one block of the logical information storage area (310) storing the operation system (302). In an additional embodiment of the invention, a device-dependent encryption key from the hidden area (318)

or from the information area (320) is used to decrypt the required activation information for at least one software program in the operation system (302). In another embodiment of the invention, a combination of a user-dependent encryption key and a device-dependent encryption key is used to decrypt information for the operation system (302) in the portable apparatus (326). If the decrypted information can be successfully loaded into the host computer (328), an authenticated connected-state operation environment is established between the operation system (302) in the portable apparatus (326) and the host computer (328) in STEP 708.

Figure 8:
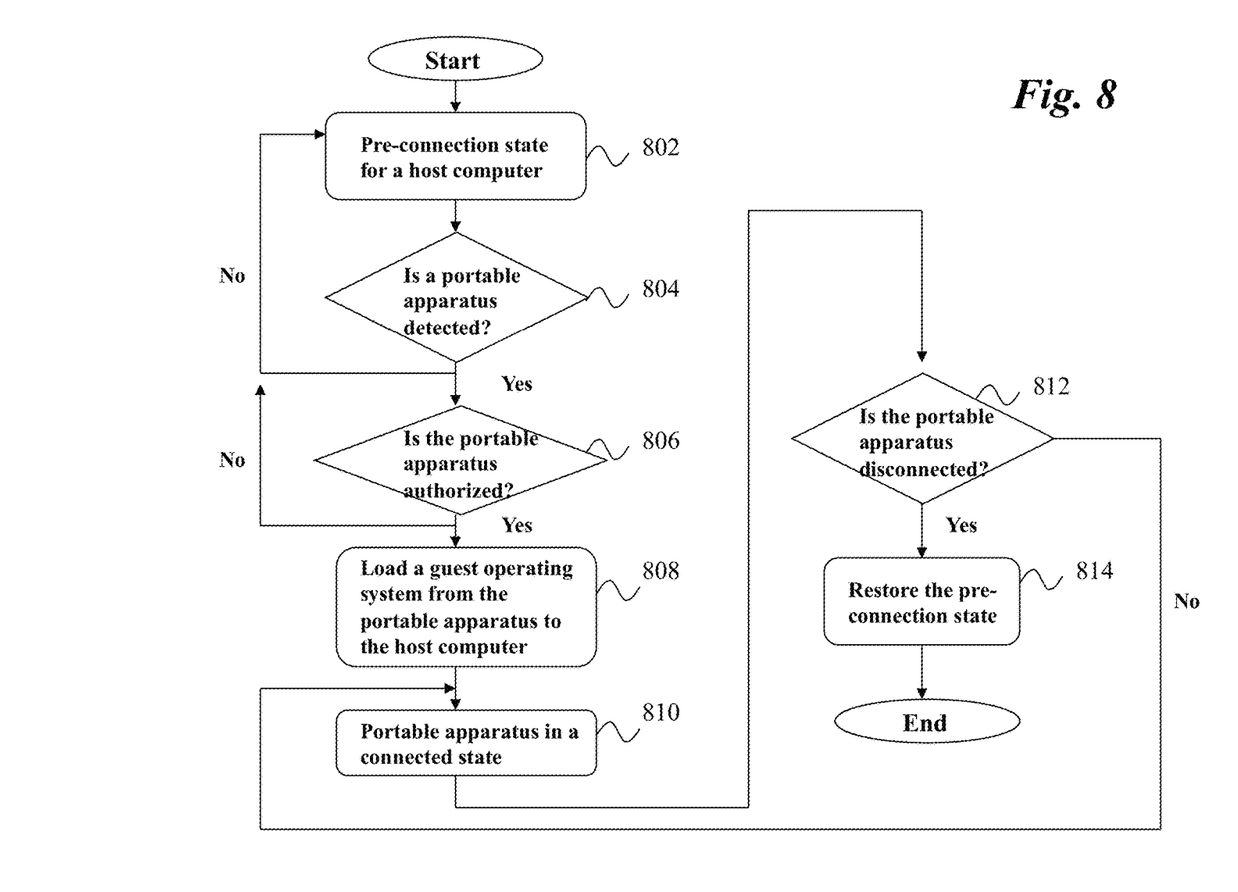
FIG. 8 shows a method to share information between a host computer and a portable apparatus in accordance with one or more embodiments of the invention.

FIG. 8 shows a method to share information between a host computer and a portable apparatus in accordance with one or more embodiments of the invention. These embodiments are preferred embodiments of the invention. In STEP 802, the host computer operates in a pre-connection state which is before a portable apparatus is either directly or indirectly connected to the host computer. In some instances, the host computer uses a software-level host operating system such as Windows XP, Linux, or Mac OS. In other instances, the host computer only uses a firmware or a BIOS and entirely depends its software-level operating system on a guest operating system provided by a portable apparatus after the portable apparatus enters a connected state.

In STEP 804, the host computer attempts to detect a portable apparatus which may have been either directly or indirectly connected to the host computer recently. In one embodiment of the invention, this detection is implemented by a regular polling to a peripheral connector (i.e. for detecting a direct connection) and a network (i.e. for detecting an indirect or networked connection). If the portable apparatus is detected, the host computer and the portable apparatus engage in an authorization process in STEP 806. In one embodiment of the invention, the authorization process follows authentication steps described previously for FIG. 7. In STEP 808, if the portable apparatus is authorized, the host computer loads a guest operating system from the host computer, either by placing it on top of a host operating system for a virtual operating environment or using the guest operating system as the host computer's only software-level operating environment. Once the guest operating system is loaded to the host computer, the portable apparatus and the host computer are in a connected state, as shown in STEP 810.

Continuing with FIG. 8, if the portable apparatus is determined to be disconnected from the host computer after a regular polling in STEP 812, a restoration procedure is necessary to restore the host computer to its pre-connection state, as shown in STEP 814.

In one embodiment of the restoration procedure in accordance with the invention, the pre-connection state (STEP 802) represents a safe sharing environment for the portable apparatus that is provided by a server computer connected to a host computer. When the portable apparatus is disconnected, as shown in STEP 812, the hardware profile is restored by the server computer to prevent a contaminated hardware profile from propagating viruses to other users, portable apparatuses, and host computers. In another embodiment of the invention, the pre-connection state (STEP 802) is an operation environment generated by a fixed operating image that the connected-state operation environment is running within a virtual operation environment in the pre-connection state. After the connected-state operation is disconnected, the host computer is rebooted back to its initial state using this fixed image. This image can be stored in an internal hard drive of the host computer or a network drive managed by the server computer.

Using FIG. 3 as an example to describe another embodiment of the information sharing between a host computer and a portable apparatus of FIG. 8, the information storage area (310) is a bootable partition to store an operating image for the pre-connection state of an operation system (302) stored in another logical information storage area (314). When the portable apparatus (326) connects to the host computer (328), a first connected-state operation environment is created in the host computer (328) by the operating image in the logical information storage area (310). In this embodiment of the invention, a virtual operation environment is then created within the first connected-state operation environment for a second connected-state operation environment with the operation system (302) stored in a logical information storage area (314). This method enables the first connected-state operation environment (i.e. a first guest operation system) to provide a secure virtual operation environment for the second connected-state operation environment (i.e. a second guest operation system).

Figure 9:
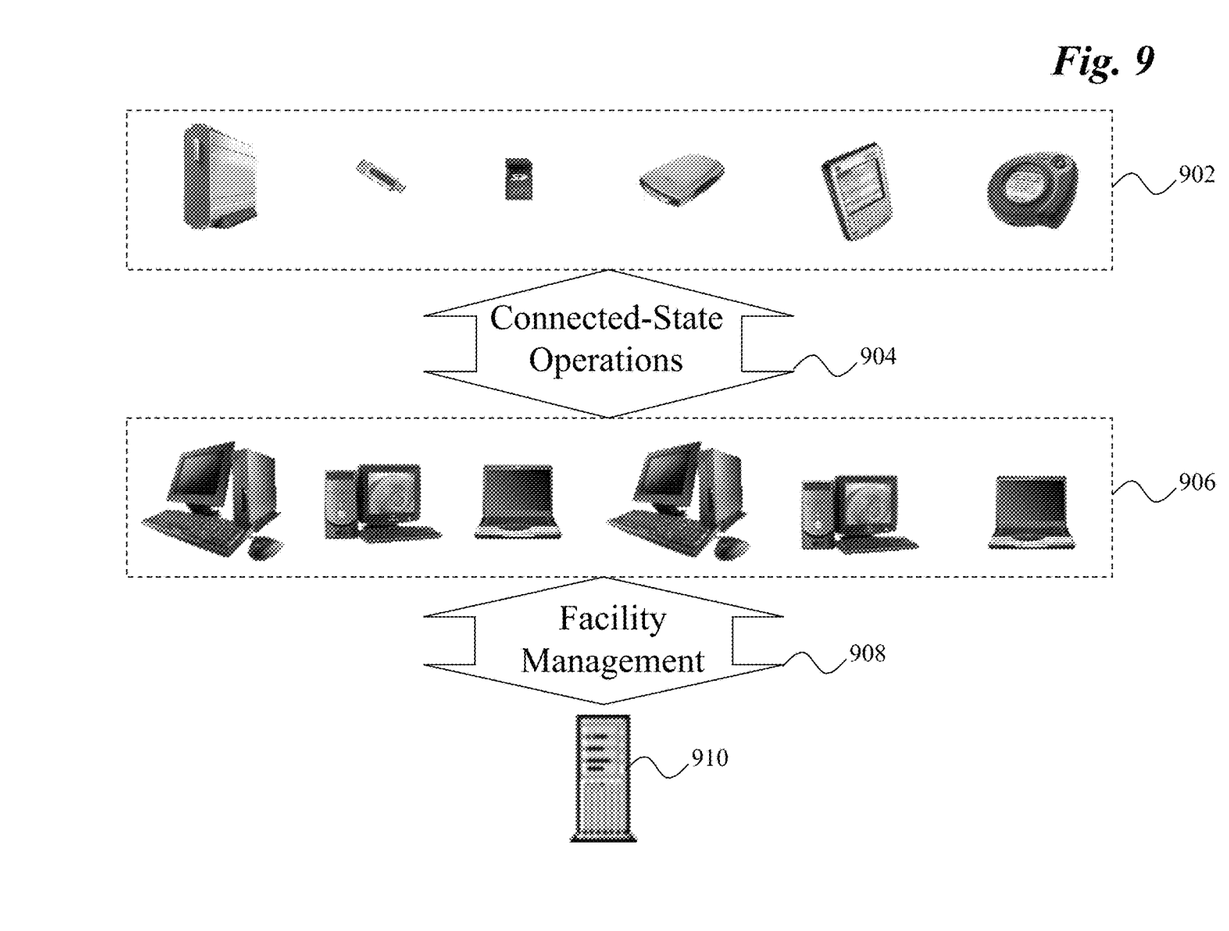
FIG. 9 shows a plurality of portable apparatuses connectively operating a plurality of host computers managed by a server computer in accordance with one or more embodiments of the invention.

FIG. 9 shows a plurality of portable apparatuses (902), a plurality of host computers (906), and a server computer (910) where the connected-state operations (904) between the plurality of portable apparatuses (902) and the plurality of host computers (906) are managed by a server computer (910) in accordance with the invention. In one embodiment of the invention, the server computer (910) supervises pre-connection states of the plurality of host computers 906 via a facility management (908). The server computer (910) can force a particular host computer to restore its pre-connection state. In another embodiment of the invention, a reservation procedure is provided by the server computer (910) to allow a particular portable apparatus to reserve a particular host computer for a particular time slot. During the particular time slot, the reserved host computer only allows the portable apparatus to establish an authenticated connected-state operation environment. In an additional embodiment of the invention, a portable apparatus loader program is controlled by the server computer (910) that only allows certain types of portable apparatuses to establish an authenticated connected-state operation environment on certain host computers. In another embodiment of the invention, a log file is created in the server computer (910), which records the usage of the plurality of host computers (906) and the plurality of portable apparatuses (902).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

What is claimed is:
1. A system comprising:
 a portable apparatus having at least one device dependent information and a computer-readable storage medium storing a guest operation system which is bound with the at least one device dependent information and is encrypted;

the portable apparatus further including a processor which is adapted to receive user dependent binding data to decrypt the guest operation system and to authenticate with the at least one device dependent information;

a host computer containing at least one peripheral device;

the host computer adapted to establish a guest operation environment from the decrypted and authenticated guest operation system wherein the guest operation environment accommodates access of the at least one peripheral device; and wherein the guest operation environment provided by the guest operation system accommodates authorized use of intellectual property data from the computer readable portable storage medium.

2. The system of claim 1, wherein the portable apparatus is at least one of a group consisting of an external hard disk, a flash memory drive, a personal data assistant (PDA), a mobile phone, a tablet computer, and a laptop.

3. The system of claim 1, wherein the at least one peripheral device is from a group consisting of: a monitor, a keyboard, a printer, a scanner, a DVD/CD-ROM, a network adapter, a controller, a button, a touch screen, and a joystick.

4. The system of claim 1, wherein the user dependent binding data may be generated from at least one of the group consisting of a user's: password, fingerprint, voice, and face recognition.

5. A system comprising:

a host computer coupled to at least one peripheral device;

a portable apparatus containing a microprocessor coupled to a memory block and a data storage medium, wherein the data storage medium unit has a guest operation system;

an authentication procedure performed in the portable apparatus to verify the guest operation system with a user-dependent encryption key;

a data communication port in the portable apparatus, wherein the data communication port accommodates transfer of data between the host computer and the portable apparatus;

a portable apparatus loader program executed in the host computer, wherein the loader program decides whether to establish an authenticated connected-state operation environment between the host computer and the portable apparatus through the data communication port; and wherein the authenticated connected-state operation environment accommodates access of the at least one peripheral device in the host computer.

6. The system of claim 5, wherein the at least one peripheral device is from a group consisting of: a monitor, a keyboard, a printer, a scanner, a DVD/CD-ROM, a network adapter, a controller, a button, a touch screen, and a joystick.

7. The system of claim 5, wherein the portable apparatus is from a group consisting of: an external hard disk, a flash memory drive, a personal data assistant (PDA), a mobile phone, a tablet computer, and a laptop.

8. The system of claim 5, wherein the user-dependent encryption key is generated from a group consisting of a user's: password, fingerprint, voice, and face recognition.

9. The system of claim 5, wherein the communication port establishes a direct or indirect connection between the host computer and the portable apparatus.

\* \* \* \* \*